United States Patent
Tam et al.

[11] Patent Number: 5,662,380
[45] Date of Patent: Sep. 2, 1997

[54] FOLDING SEAT BACK FOR STROLLER

[75] Inventors: Chun-Wah Tam, Lantau Island, Hong Kong; John S. Canna, Orchard Park, N.Y.

[73] Assignee: Fisher-Price, Inc., East Aurora, N.Y.

[21] Appl. No.: 554,911

[22] Filed: Nov. 9, 1995

[51] Int. Cl.⁶ .............................. B60N 2/02; B60N 2/24; B60N 2/30
[52] U.S. Cl. .............................. 297/354.12; 297/219.12; 297/440.11; 280/642
[58] Field of Search .................. 297/354.12, 219.12, 297/440.11; 280/642, 47.37

[56] References Cited

U.S. PATENT DOCUMENTS

| | | | |
|---|---|---|---|
| 4,435,012 | 3/1984 | Kassai | 297/354.12 |
| 4,478,453 | 10/1984 | Schutz | 297/219.12 |
| 4,610,460 | 9/1986 | Kassai | 280/642 X |
| 4,824,168 | 4/1989 | Makoski | 297/188.06 X |
| 5,205,577 | 4/1993 | Liu | 280/642 |
| 5,205,578 | 4/1993 | Liu | 280/642 |
| 5,366,271 | 11/1994 | Johnston et al. | 297/578.12 X |
| 5,417,449 | 5/1995 | Shamie | 280/642 |
| 5,447,323 | 9/1995 | Huang | 280/642 |
| 5,460,398 | 10/1995 | Huang | 280/642 |
| 5,482,311 | 1/1996 | Huang | 280/642 |
| 5,490,685 | 2/1996 | Kitayama et al. | 297/354.12 X |

*Primary Examiner*—Peter M. Cuomo
*Assistant Examiner*—Rodney B. White
*Attorney, Agent, or Firm*—Morgan, Lewis and Bockius, LLP; C. Scott Talbot

[57] ABSTRACT

A reclining seat for use in a stroller or similar device incorporating flexible elements having shape memory characteristics integrally affixed along the upper portion of the seat's side webs such that during conversion from a reclined position to an upright position, the flexible elements urge the side webs inwardly, away from the latching mechanism, inhibiting entanglement of the webs in the latching mechanism.

20 Claims, 14 Drawing Sheets

FOLDING SEAT BACK FOR STROLLER

BACKGROUND OF THE INVENTION

This invention relates to a flexible seat for an infant or child carrier such as a stroller. More specifically, the invention relates to a reclining seat having side web portions extending between the sides of the seat back and the stroller frame.

Many existing infant carriers, particularly strollers, are capable of altering the angle of inclination of the seat back portion from a sitting position to a reclined or horizontal position. The seat back is typically hingedly mounted so that it pivots relative to the side members of the stroller frame. One conventional mechanism to retain the stroller seat back in an upright position is a releasably interlocking peg and slot connection, in which a peg extends laterally outward from each side edge of the seat back, and in the upright position engages a slot in a resilient or biased pivoting latch mounted on each side of the stroller frame. Fabric webs are each attached to one seat back side edge and to one side of the stroller frame. In the reclined position, the side webbing of the seat lies in tension, suspending and supporting the seat back. In the upright position, the peg and slot are interlocked and the webs are collapsed, effectively maintaining the seat back in an upright position.

A disadvantage of the configuration described above is that it does not provide a means for biasing the web portions proximate the seat back latching mechanism away from the latching points. When converting the stroller seat back from a reclined position (where the peg and slot are not interlocked) to an upright position (where the peg and slot are interlocked) the collapsing side webs of a flexible stroller seat tend to bunch up around the peg and slot connection points, so that the fabric sides become caught and block the engagement of the connection points. Accordingly, there exists a need for a stroller seat back that effectively biases the web portions away from the latching points during movement from the reclined to the upright position.

SUMMARY OF THE INVENTION

The drawbacks of the prior art are overcome by the apparatus of the invention, which provides a method and apparatus for inhibiting or preventing the side web portions of a flexible reclining seat from becoming entangled with the mechanism that locks the seat in a reclined position or an upright position.

More particularly, according to one aspect of the present invention, there is provided a reclining seat for use in a stroller or similar device incorporating a means to bias the side portions inward during transformation from the reclining position to the upright position. In another aspect, resilient elements having shape memory characteristics are affixed along the upper aspects of the side web portions such that during conversion from the reclined position to the upright position, the flexible elements influence the side portions inward, away from the latching mechanism, inhibiting or precluding the possibility of entanglement.

DETAILED DESCRIPTION

Referring to FIGS. 1 through 10 of the attached drawings, the preferred embodiment of the present invention will now be described. The invention is described and illustrated below in the context of an infant stroller, although the invention may be used on any similar device, such as one in which the occupant may be seated or reclining (including, but not limited to, swings, bassinets, carriages, car seats, shopping carts, or walkers), where it is desirable to provide a reclining seat with side webs urged away from entanglement with engagement points.

Figure 1:
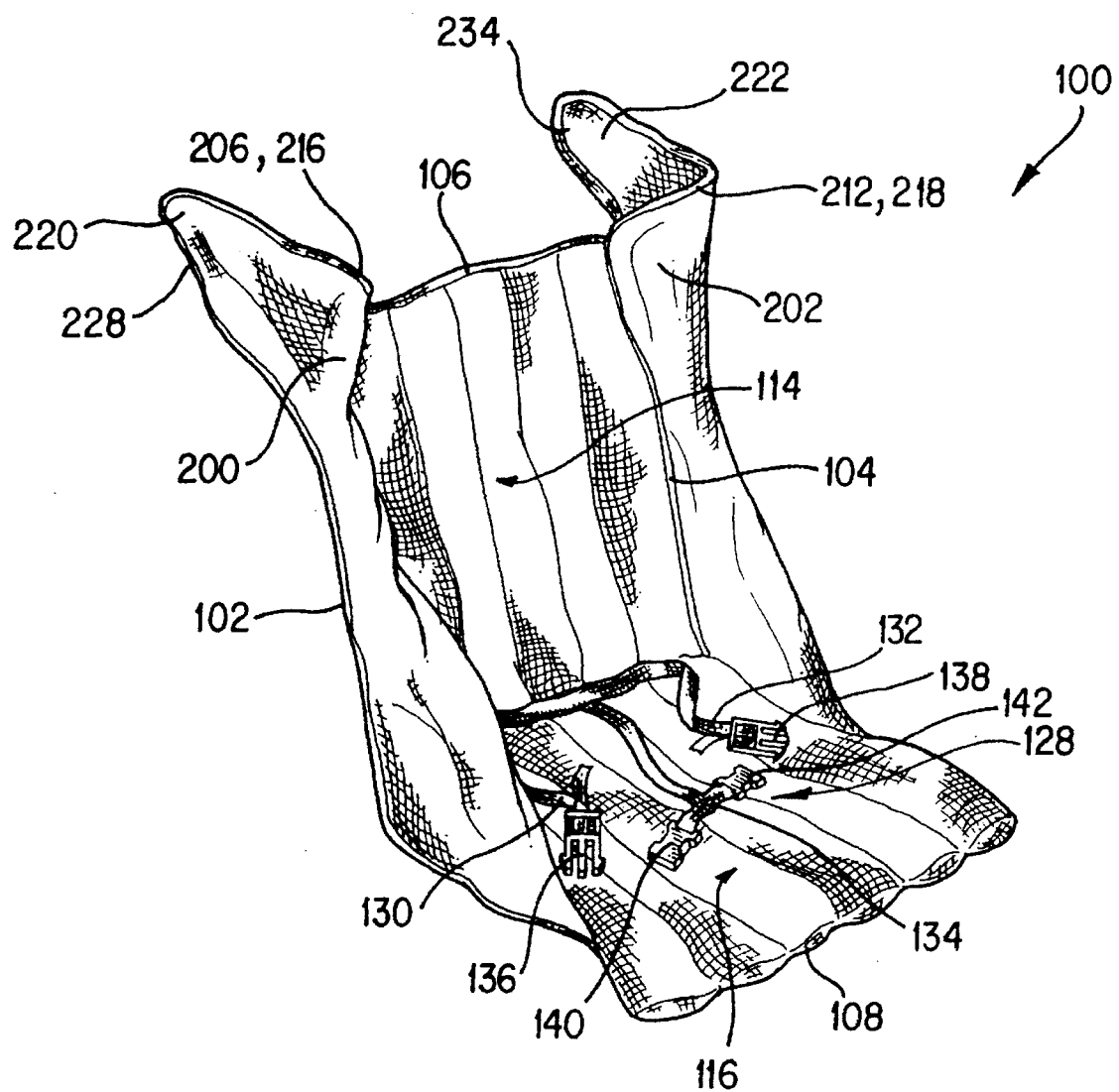
FIG. 1 is a perspective view of the reclining seat member.
Figure 2:
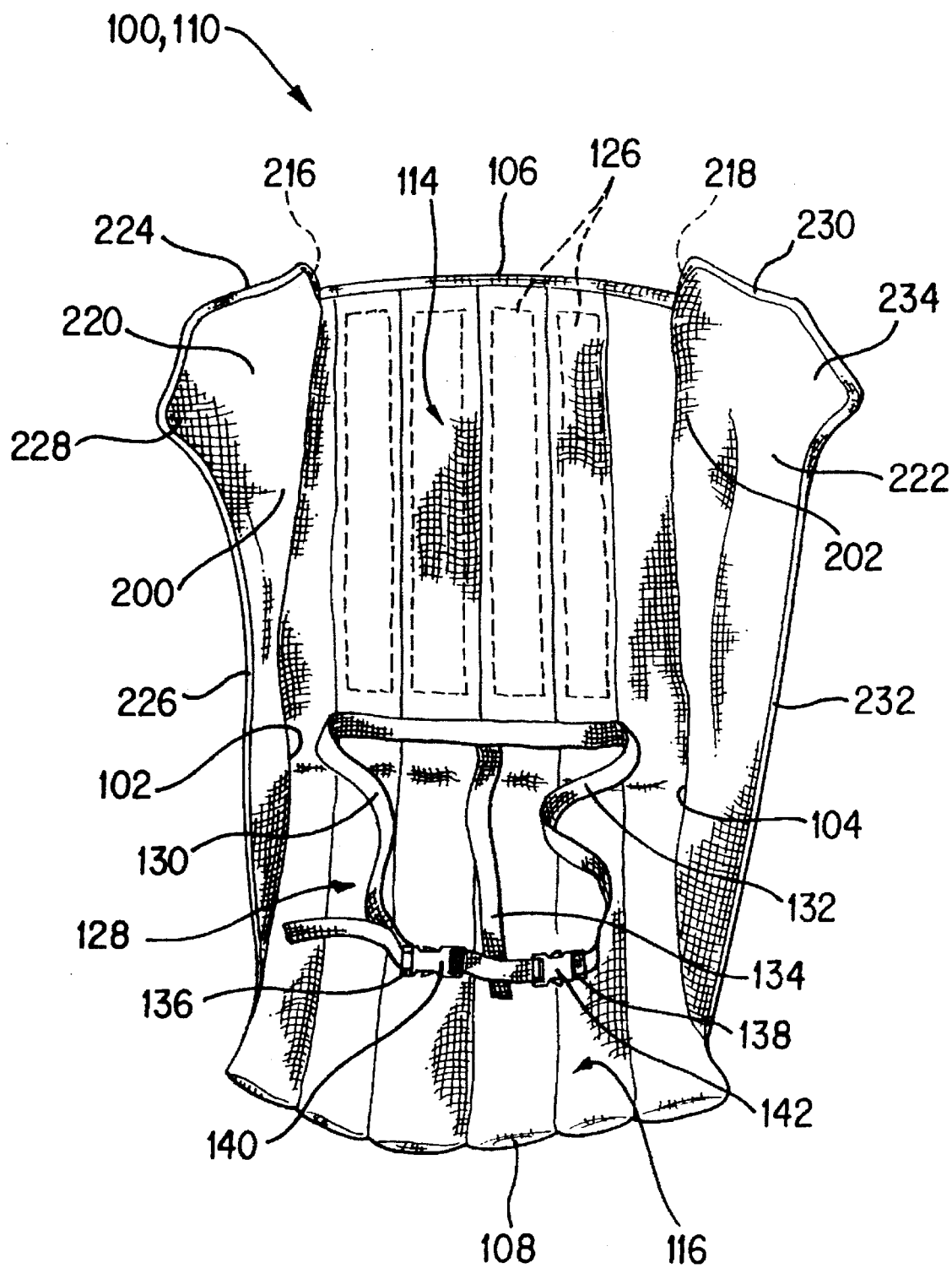
FIG. 2 is a front view of the reclining seat member.
Figure 3:
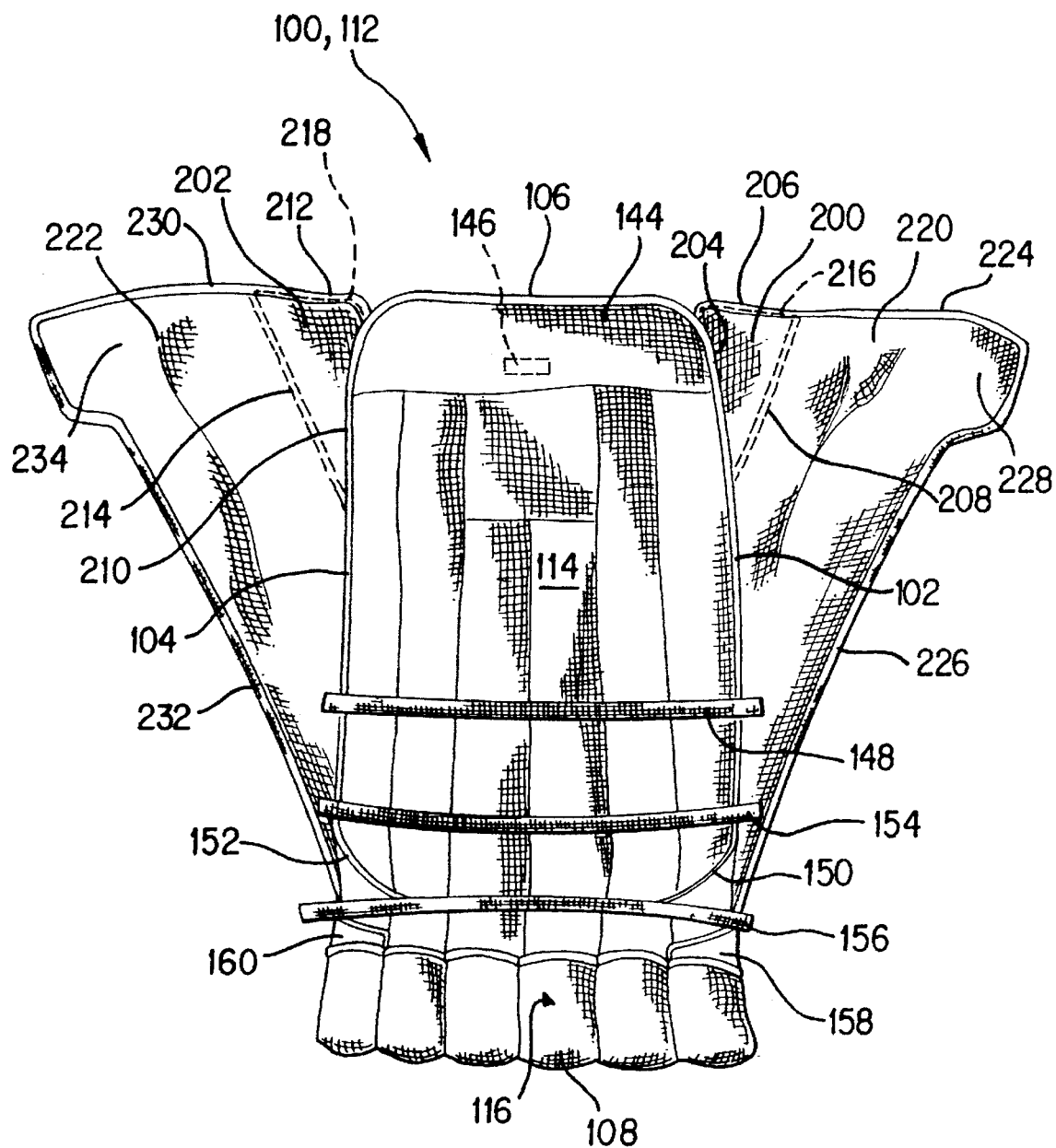
FIG. 3 is a rear view of the reclining seat member.

A flexible reclining seat 100 is illustrated in FIGS. 1 through 3. The reclining seat 100 has first and second vertical edges 102, 104, first and second horizontal edges 106, 108, a front surface 110, a rear surface 112, a reclining portion 114, a seat portion 116, first and second inner web portions 200, 202 and first and second outer web portions 220, 222. The front surface 110, shown in detail in FIG. 2, functions as the seating surface for the child while in the infant carrier or like apparatus.

The reclining portion 114 is movable between a reclined position and a substantially upright position. The reclined position may be completely horizontal or partially reclined whereas the upright position may be completely vertical or slightly reclined in relation to the vertical. Although the preferred embodiment has only these two operative positions, the reclining portion 114 may also have additional positions between the fully reclined position and the upright position. The reclining portion 114 includes a series of four rigid battens 126. The rigid battens 126, which provide additional back support for the occupant, are permanently encased within the fabric which comprises the reclining portion 114 and are located parallel to and between the first and second vertical edges 102, 104.

As best shown in FIG. 2, the front surface 110 may include a conventional T-shaped restraint system 128, used to secure the infant in the reclining seat 100. Of course, any suitable restraint system may be included. The T-shaped restraint system 128 is comprised of first and second lateral tethers 130, 132 and a crotch tether 134. Slidingly attached to the terminal ends of the first and second lateral tethers 130, 132, which are permanently affixed to the lower aspects of the reclining portion 114, are first and second buckles 136, 138. The first and second buckles 136, 138 are identical in form and function. The crotch tether 134, integrally affixed to the lower aspects of the reclining portion 114 as well as the upper aspects of the seat portion 116, terminates in first and second receiving buckles 140, 142. The first and second receiving buckles 140, 142 are oriented such that they may releasably engage with the first and second buckles 136, 138.

The seat portion 116 serves as the surface for supporting the infant's buttocks and legs. In an effort to improve comfort, the lower aspects of the seat portion 116 are rolled over to form the second horizontal edge 108. The excess fabric of the seat portion 116 is permanently affixed (by stitching or other conventional means) to the rear surface 112 (as shown in FIG. 3 and described below).

Referring to FIG. 3, the rear surface 112 will now be described. Residing along the first horizontal edge 106 of the rear surface 112 is the reclining tube pocket 144, whose use will become apparent below. Centrally disposed along the lower aspects of the reclining tube pocket 144 is the pocket closure means 146. The pocket closure means 146 may comprise a conventional latch and hook connector, a button connector or any other similar fastening means. Located slightly above the intersection between the reclining portion 114 and the seat portion 116 is a first attachment tether 148. The first attachment tether 148 spans the distance between the first and second vertical edges 102, 104. As illustrated in FIG. 3, the terminal ends of the first attachment tether 148 reside outside of the area defined by the first and second vertical edges 102, 104 and the first and second horizontal edges 106, 108. In an effort to further define the hinge point between the reclining portion 114 and the seat portion 116, first and second reinforced stitching sections 150, 152 are provided. The first and second reinforced stitching sections 150, 152 separate the reclining portion 114 from the seat portion 116. Located along the upper aspects of the seat portion 116 on the rear surface 112, parallel to the first attachment tether 148 and spanning the distance between the first and second vertical edges 102, 104, is a second attachment tether 154. Residing parallel to and below the second attachment tether 154, spanning the distance between the first and second vertical edges 102, 104, is a third attachment tether 156. Similar to the first attachment tether 148, the second and third attachment tethers 154, 156 incorporate terminal ends which reside outside the area defined by the first and second vertical edges 102, 104 and the first and second horizontal edges 106, 108. The number and location of attachment tethers may be altered to accommodate any frame type or size. Located slightly below the third attachment tether 156, permanently affixed to the first and second vertical edges 102, 104, respectively, are first and second seat tube pockets 158, 160. The first and second seat tube pockets 158, 160 occupy space defined by the lower edge of the third attachment tether 156 to the second horizontal edge 108, as shown by hidden lines in FIG. 3. Although the reclining seat 100 is attached to the stroller frame by the first, second and third attachment tethers 148, 154, 156 and the first and second seat tube pockets 158, 160, the reclining seat 100 may be attached to the stroller frame 300 in any manner which allows the reclining portion 114 to move from a reclined position to a substantially upright position.

The first and second vertical edges 102, 104 serve as web attachment edges. Permanently attached to the first and second vertical edges 102, 104 are the first and second inner web portions 200, 202. The first inner web portion 200 is generally triangular in shape, having first, second and third inner web edges 204, 206, 208. The first inner web edge 204 is permanently affixed to the first vertical edge 102, traversing from the intersection between the first horizontal edge 106 and the first vertical edge 102 to the intersection between the reclining portion 114 and the seat portion 116. In like fashion, the second inner web portion 202 is generally triangular in shape, having fourth, fifth and sixth inner web edges 210, 212, 214. The fourth inner web edge 210 is permanently affixed to the second vertical edge 104, traversing from the intersection between the first horizontal edge 106 and the second vertical edge 104 to the intersection between the reclining portion 114 and the seat portion 116. Incorporated along the second inner web edge 206 and the upper aspects of the first inner web edge 204 is a first shape memory element 216. The first shape memory element 216 is constructed such that it exhibits a tendency to bias the second inner web edge 206 inward, toward the plane defined by the first and second horizontal edges 106, 108 and the first and second vertical edges 102, 104. As most accurately illustrated in FIGS. 3 and 4, portions of the first shape memory element 216 are permanently attached by stitching along the upper aspects of the first inner web edge 204 and a segment of the second inner web edge 206.

Figure 4:
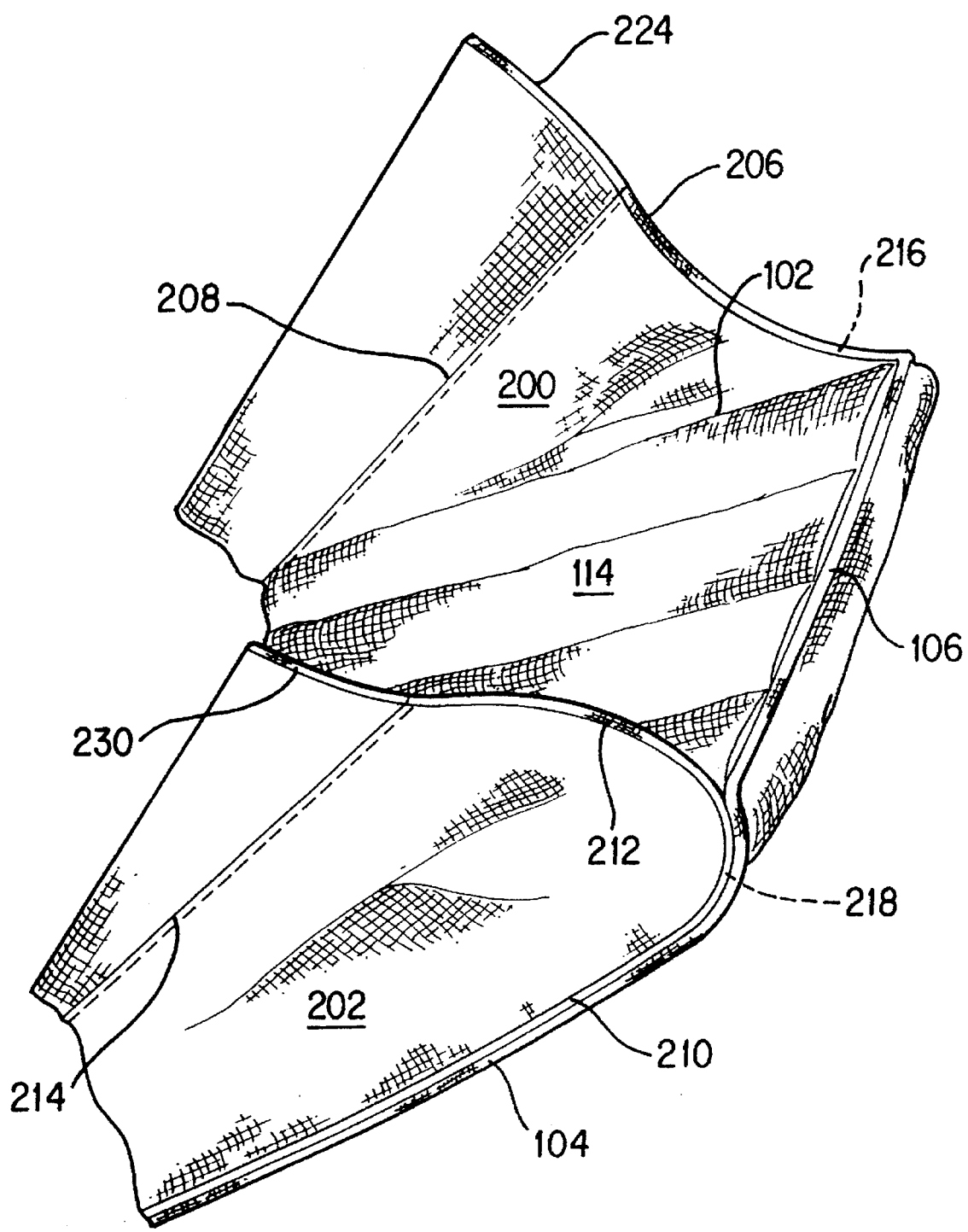
FIG. 4 is a perspective view of a portion of the reclining seat member.
Figure 4A:
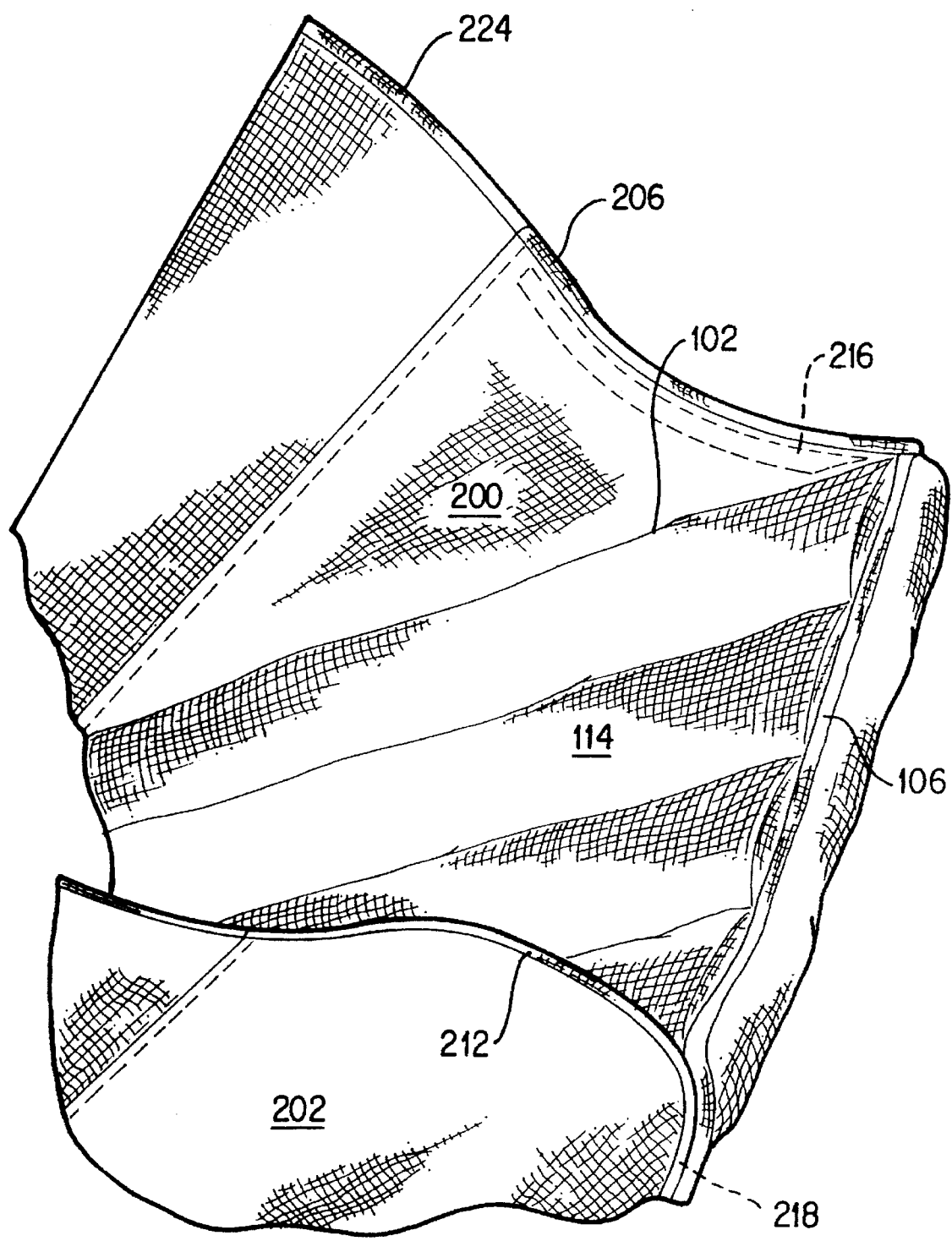
FIG. 4A is an enlarged partial view of the reclining seat member of FIG. 4, showing the alternative embodiment of FIG. 3A.
Figure 4B:
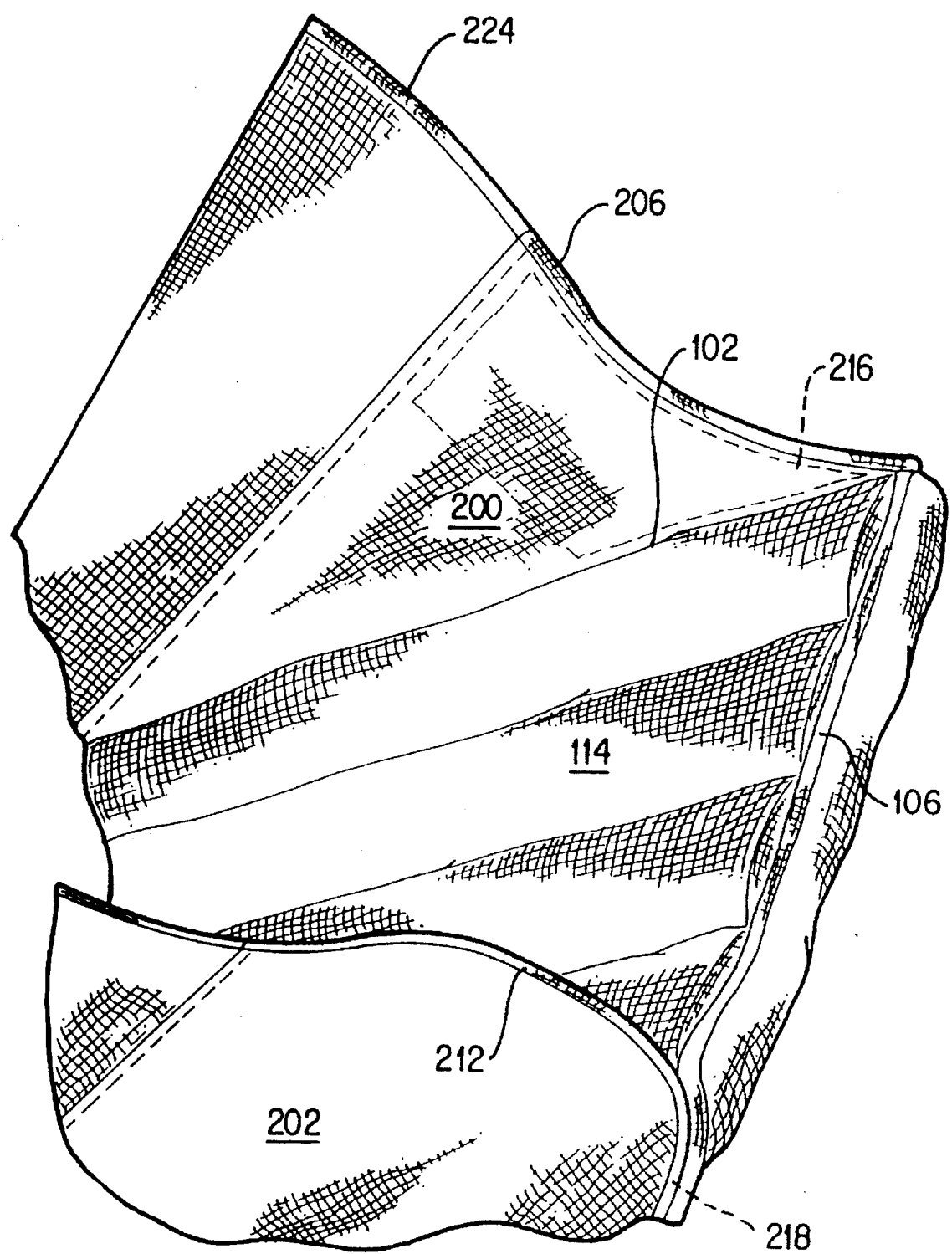
FIG. 4B is an enlarged partial view of the reclining seat member of FIG. 4, showing the second alternative embodiment of FIG. 3B.
Figure 5:
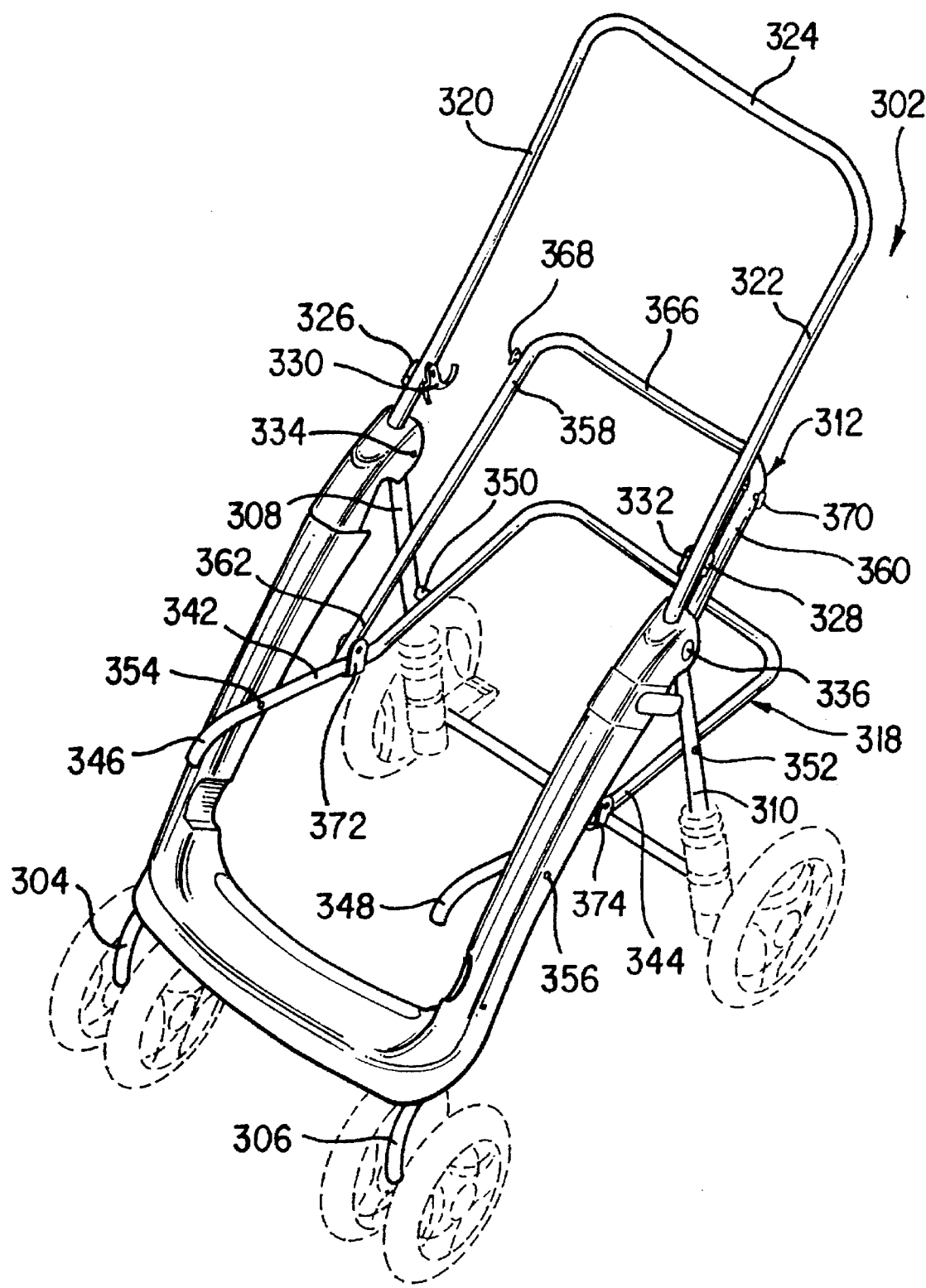
FIG. 5 shows a perspective view of an infant stroller frame.

As seen in FIGS. 3 and 4, in the preferred embodiment, the first vertical edge 102 of the reclining portion meets the horizontal edge 106 in a radiused curve. The first inner web edge 204 meets the second inner web edge 206 in a similar radiused curve. These two curves are partially stitched together as shown so that one end of the shape memory element lies in the plane of seat back and follows the curve in the inward direction. Since the middle of the shape memory element curves inward, the free end is biased inward. Thus, the nature of this attachment inhibits the first shape memory element 216, and therefore the first inner and first outer web portions 200, 220, from traveling outside the area defined by the first and second vertical edges 102, 104 and the first and second horizontal edges 106, 108 while raising the reclining portion 114 from a reclined position to an upright position. Although the above attachment is preferred, the first shape memory element 216 could be constructed in a manner which allows it to be attached to only one edge.

In a like manner, the fifth inner web edge 212 and the upper aspects of the fourth inner web edge 210 incorporate a second shape memory element 218. The second shape memory element 218 is constructed such that it exhibits a tendency to bias the fifth inner web edge 212 inward, toward the plane defined by the first and second horizontal edges 106, 108 and the first and second vertical edges 102, 104. As depicted in FIG. 3, portions of the second shape memory element 218 are permanently attached along the upper aspects of the fourth inner web edge 210 and a segment of the fifth inner web edge 212.

As seen in FIGS. 3 and 4, in the preferred embodiment, the second vertical edge 104 of the reclining portion meets the horizontal edge 106 in a radiused curve, the fourth inner web edge 210 meets the fifth inner web edge 212 in a similar radiused curve. These two curves are partially stitched together as shown so that one end of the shape memory element lies in the plane of seat back and follows the curve in the inward direction. Since the middle of the shape memory element curves inward, the free end is biased inward. The nature of this attachment further inhibits the second shape memory element 218, and therefore the second inner and second outer web portions 202, 222, from traveling outside the area defined by the first and second vertical edges 102, 104 and the first and second horizontal edges 106, 108 while raising the reclining portion 114 from a reclined position to an upright position. Similar to the first shape memory element 216, the second shape memory element 218 may be alternatively constructed in a manner which allows it to be attached to only one edge.

Figure 3A:
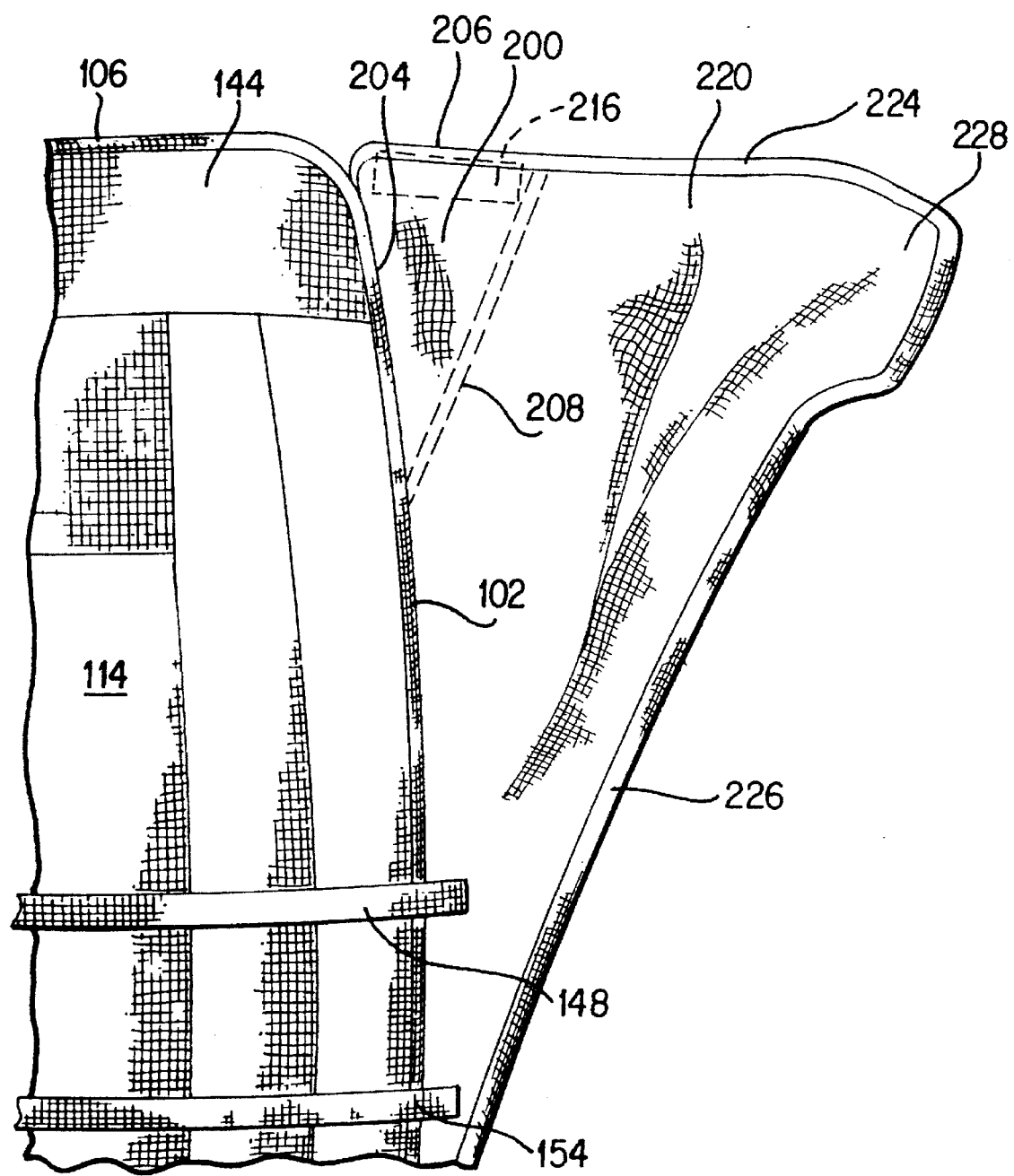
FIG. 3A is an enlarged partial view of the reclining seat member of FIG. 3, showing an alternative embodiment of a shape memory element.
Figure 3B:
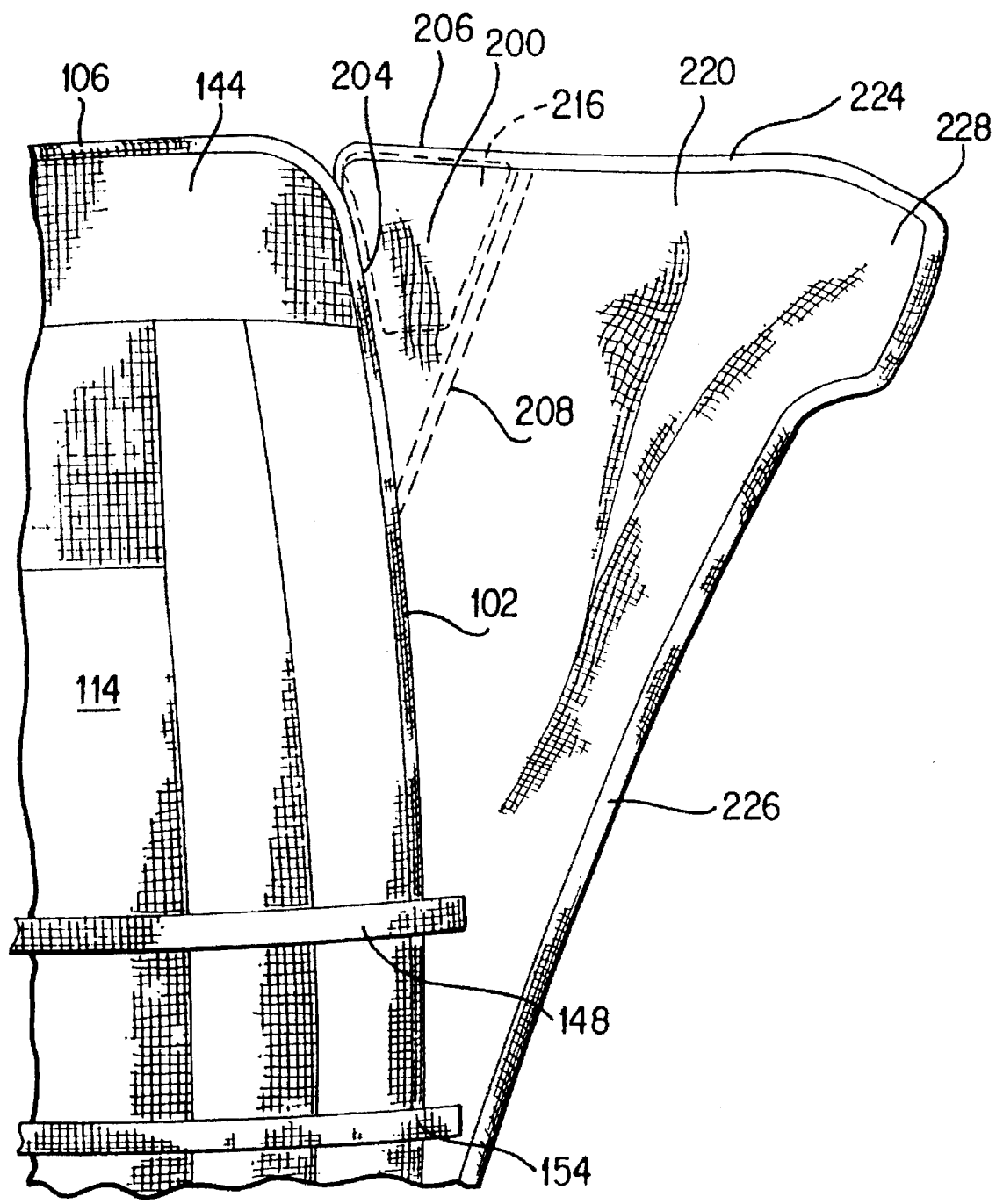
FIG. 3B is an enlarged partial view of the reclining seat member of FIG. 3, showing a second alternative embodiment of a shape memory element.

In the preferred embodiment, the shape memory elements are provided by a high density polypropylene cord having a diameter of approximately 0.125 inches. However, the first and second shape memory elements 216, 218 may alternatively be formed of polypropylene cord or high density polyethylene cord, for of flexible metal cord or wire. Alternatively, instead of being formed in the shape of a cylindrical cord, the first and second shape memory elements 216, 218 may be formed as a sheet (FIG. 3A) or strip (FIG. 3B) The shape memory elements may be formed of any other similar element exhibiting shape memory characteristics.

Permanently attached to the third and sixth inner edges 208, 214, respectively, are the first and second outer web portions 220, 222. The first and second inner web portions 200, 202 and the first and second outer web portions 220, 222 together form first and second web portions. Of course, any of the first and second inner web portions 200, 202, the first and second outer web portions 220, 222 and the reclining portion 114 could be integral with one another, comprising a single piece of material. The first outer web portion 220 includes first and second outer web edges 224, 226. The first and second outer web edges 224, 226 intersect to form a first tab 228. The second outer web edge 226 extends from the first tab 228 to the seat portion 116 on the front surface 110, proximal the location of the second seat tube pocket 160. The lower aspects of the second outer web edge 226 are permanently attached to the first vertical edge 102. The second outer web portion 222, includes third and fourth outer web edges 230, 232. The third and fourth outer web edges 230, 232 intersect to form a second tab 234. The fourth outer web edge 232 extends from the second tab 234 to the seat portion 116 on the front surface 110, proximal the location of the first seat tube pocket 158. The lower aspects of the fourth outer web edge 232 are permanently attached to the second vertical edge 104. The first and second tabs 228, 234 exist to secure the flexible reclining seat 100 to the stroller frame 300 or similar device, described in detail below. Tethers attached to the first and second outer web portions 220, 222 proximal the locations of the first and second tabs 228, 234 may alternatively be used to secure the flexible reclining seat 100 to the stroller frame 300.

Figure 6:
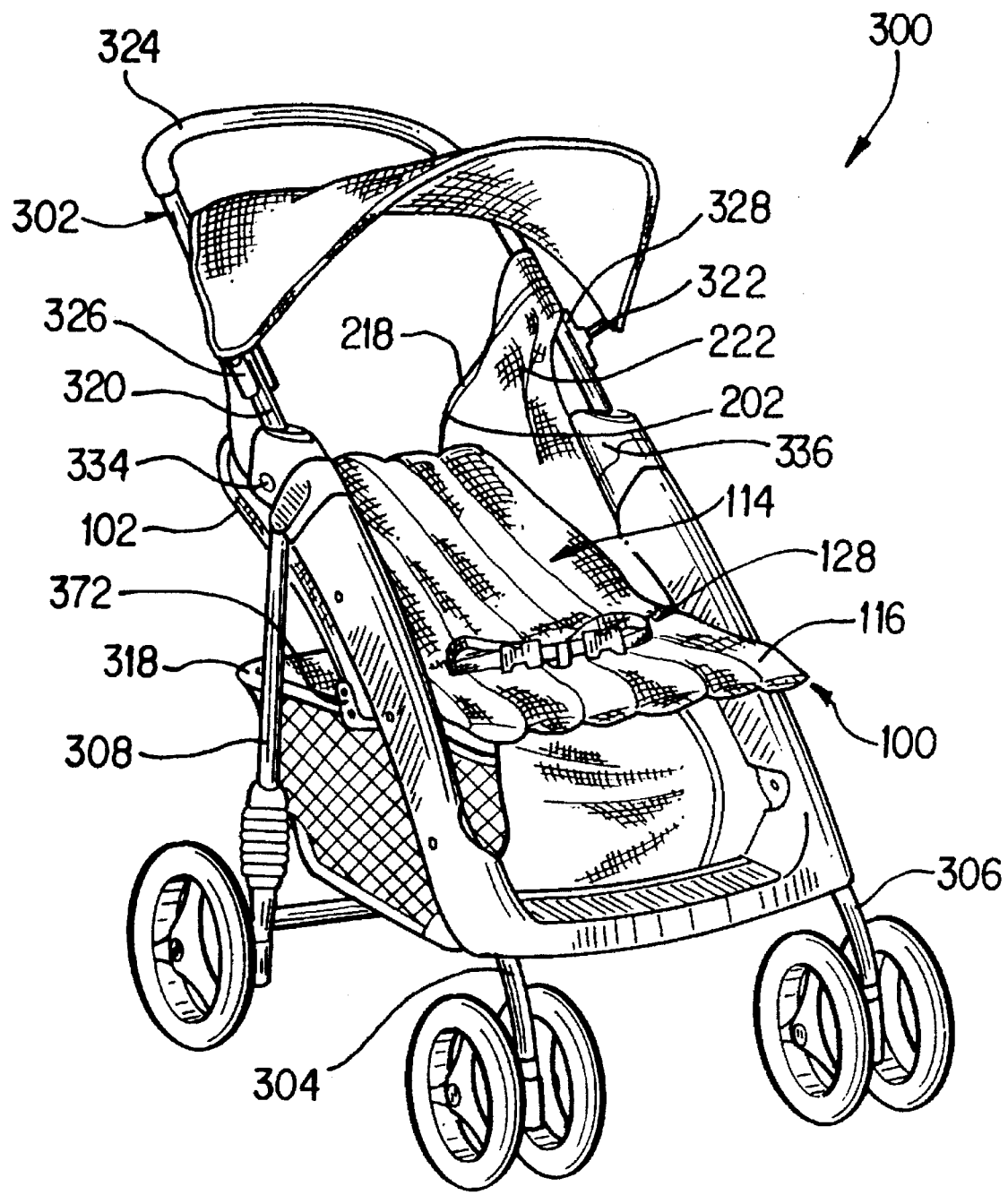
FIG. 6 shows a perspective view of an infant stroller employing a reclining seat constructed in accordance with the invention when in its lowered (reclined) position.
Figure 7:
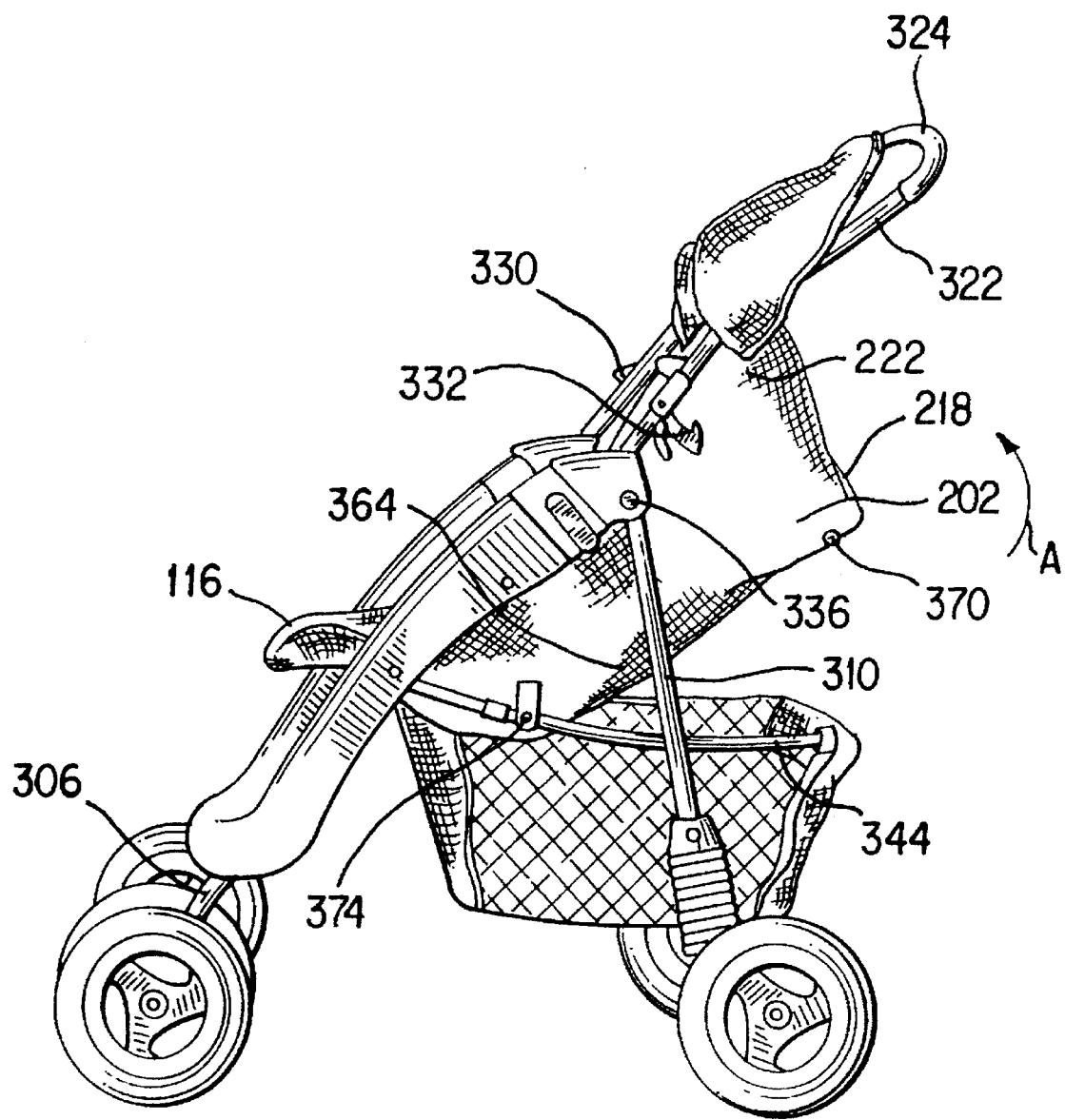
FIG. 7 is a side view of an infant stroller employing a reclining seat constructed in accordance with the invention when in its lowered (reclined) position.
Figure 8:
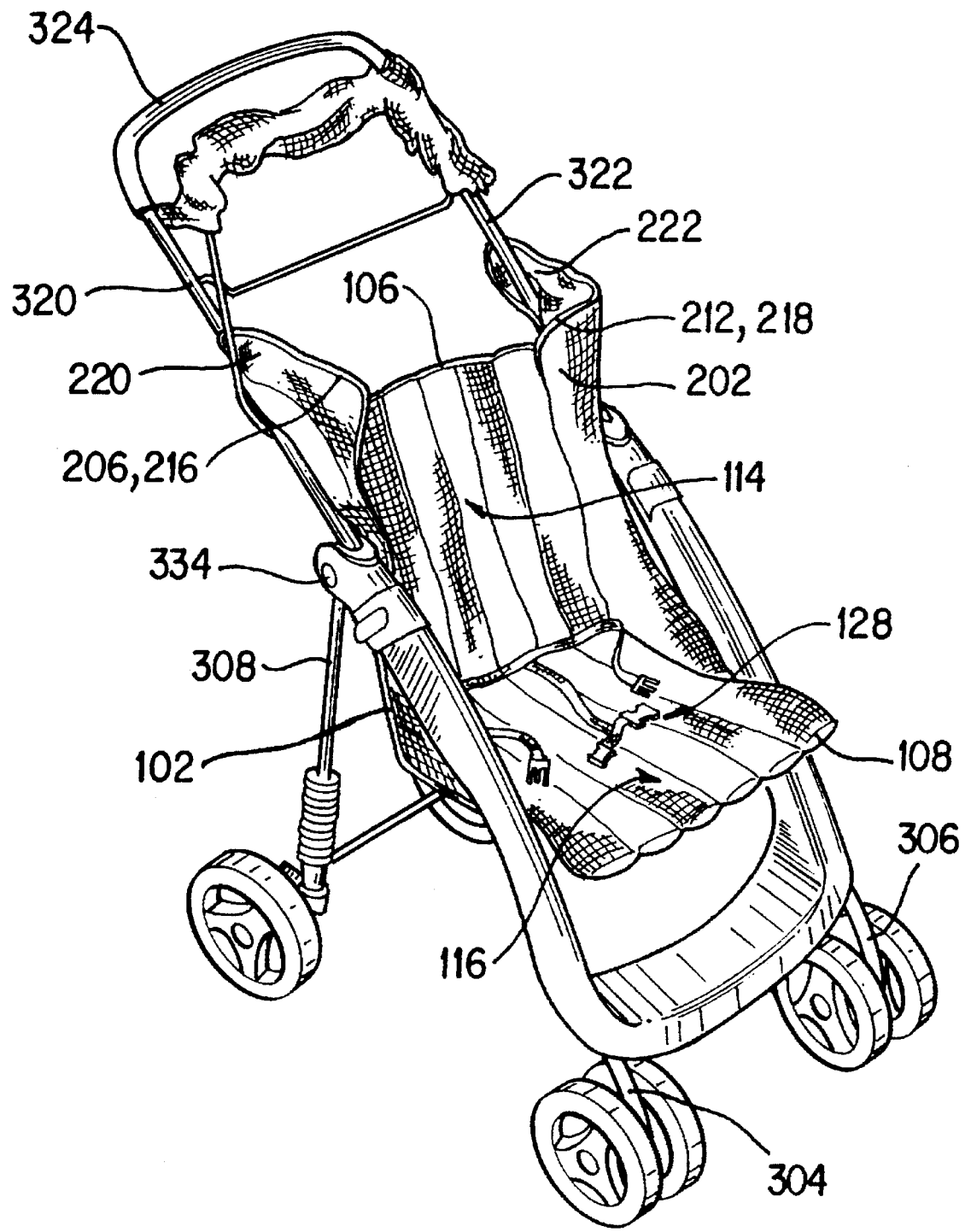
FIG. 8 shows a perspective view of an infant stroller employing a reclining seat constructed in accordance with the invention when in its raised (upright) position.
Figure 9:
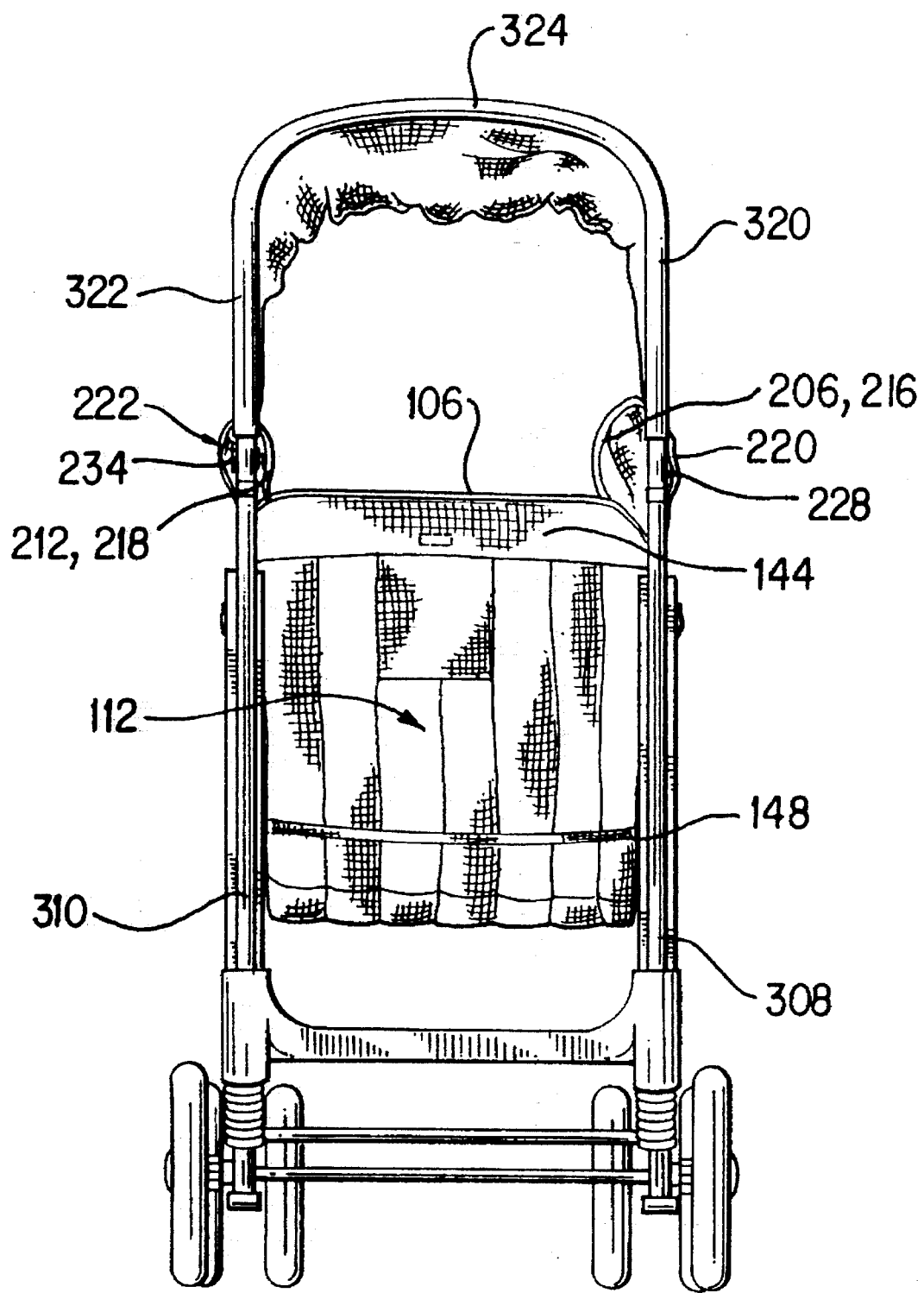
FIG. 9 is a rear view of an infant stroller employing a reclining seat constructed in accordance with the invention when in its raised (upright) position.
Figure 10:
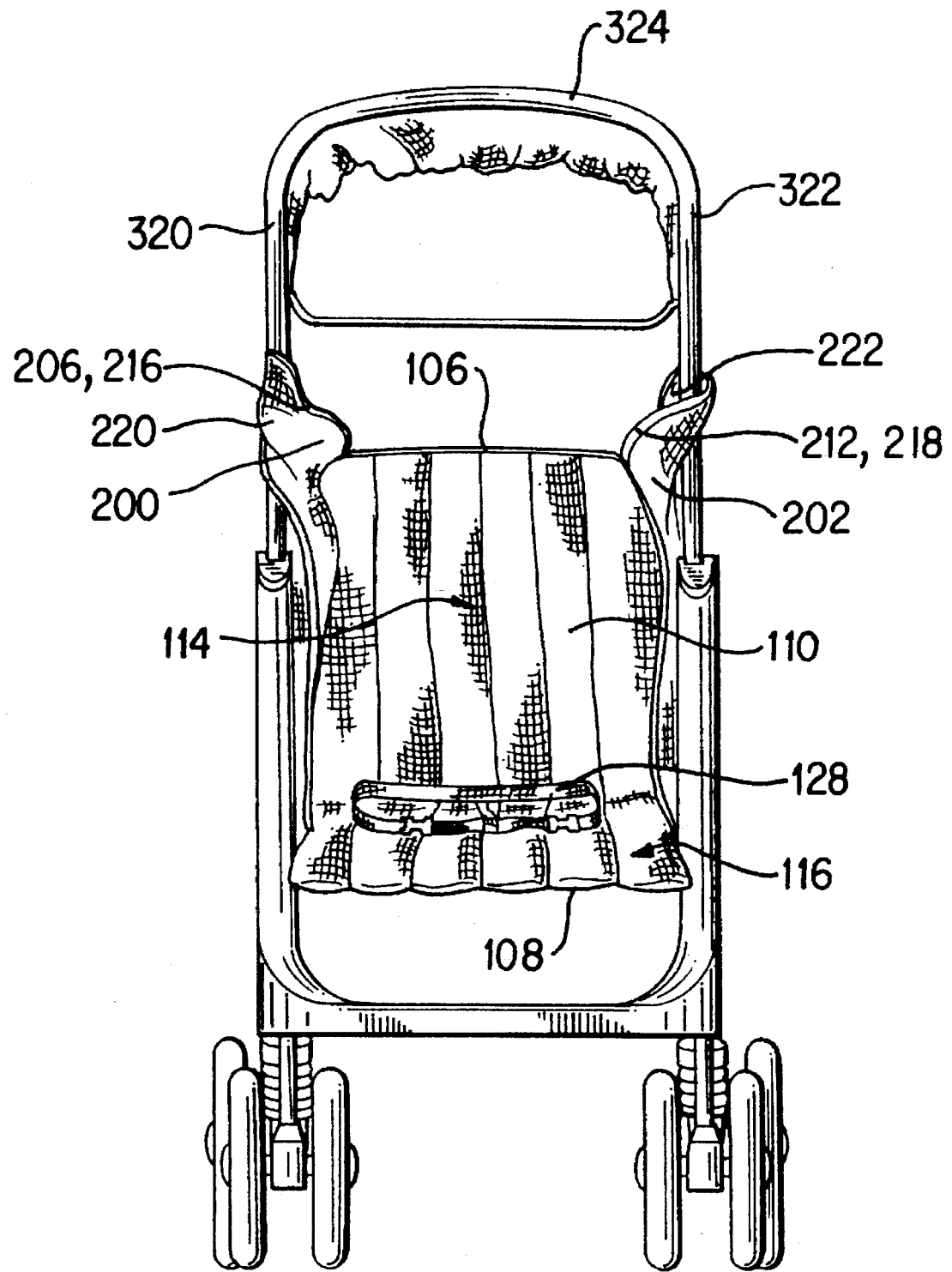
FIG. 10 is a front view of an infant stroller employing a reclining seat constructed in accordance with the invention when in its raised (upright) position.

A stroller frame 300 is illustrated in FIGS. 5 through 10 as an example of the type of stroller frame for which the invention is suited. Although the seat is adapted for use in a stroller, it may, of course, be utilized in any child carrying device. The stroller frame 300 incorporates a handle tube 302, first and second front wheel support tubes 304, 306, first and second rear wheel support tubes 308, 310, a reclining tube 312 and a connector tube 318. As illustrated in FIGS. 4 and 6, the handle tube 302 is generally u-shaped having first and second tubes 320, 322 and a first u-tube portion 324. Permanently attached to the first and second tubes 320, 322 are first and second canopy mounts 326, 328 and first and second biased catches 330, 332. The first and second canopy mounts 326, 328 and the first and second biased catches 330, 332 may be mounted at the same location on opposing sides of the first and second tubes 320, 322, respectively. Of course, canopy mounts may prove unnecessary in some applications. The handle tube 302 is pivotally connected to both the first and second rear wheel support tubes 308, 310 and the first and second front wheel support tubes 304, 306. The first and second tubes 320, 322 are connected to the first and second rear wheel support tubes 308, 310 at first and second handle tube pivot mounts 334, 336. In a similar fashion, the handle tube 302, and more particularly the first and second tubes 320, 322, are connected to the first and second front wheel support tubes 304, 306 at third and fourth handle tube pivot mounts 338, 340 (not shown).

The connector tube 318 is generally u-shaped having third and fourth tubes 342, 344 and first and second curved connector tube ends 346, 348. The connector tube 318 is pivotally connected to the first and second rear wheel support tubes 308, 310 at first and second rear wheel support tube pivot mounts 350, 352. The first and second front wheel support tubes 304, 306 are pivotally connected to the connector tube 318, proximate the first and second connector tube ends 346, 348, at first and second front wheel support tube pivot mounts 354, 356.

The reclining tube 312, which is generally u-shaped, includes first and second web tubes 358, 360 having first and second web tube ends 362, 364, and a seat back u-tube portion 366. Permanently attached to the first and second web tubes 358, 360, proximate the intersection between the first and second web tubes 358, 360 and the seat back u-tube portion 366, are first and second pegs 368, 370. The first and second web tube ends 362, 364 are pivotally connected to the connector tube 318 at first and second reclining tube pivot mounts 372, 374, which reside between the first and second rear wheel support tube pivot mounts 350, 352 and the first and second front wheel support tube pivot mounts 354, 356.

The flexible reclining seat 100 is attached to the stroller frame 300 as described below. Although the description below refers to attachment to a stroller, the flexible reclining seat may be utilized on a wide variety of devices, including but not limited to swings, bassinets, carriages, car seats, shopping carts or walkers. The flexible reclining seat 100 has connection points on the handle tube 302, the reclining tube 312 and the connector tube 318.

The seat portion 116 of the flexible reclining seat 100 is attached to the stroller frame 300 in the following manner. The first and second curved connector tube ends 346, 348 of the connector tube 318 are inserted into the first and second seat tube pockets 158, 160, which reside on the rear surface 112 of the flexible reclining seat 100. An additional tether could effectively take the place of the first and second seat tube pockets 158, 160. The terminal ends of the third attachment tether 156, which reside on the rear surface 112 and protrude outside the area defined by the first and second vertical edges 102, 104 and the first and second horizontal edges 106, 108, are fastened to the third and fourth tubes 342, 344, proximal the first and second front wheel support tube pivot mounts 354, 356. The terminal ends of the third attachment tether 156 may be fastened to the third and fourth tubes 342, 344 by conventional means, for example by rivets or latch and hook connectors. In a like manner, the second attachment tether 154 is secured to the third and fourth tubes 342, 344. More particularly, the terminal ends of the second attachment tether 154, which reside on the rear surface 112 and protrude outside the area defined by the first and second vertical edges 102, 104 and the first and second horizontal edges 106, 108, are fastened to the third and fourth tubes 342, 344 between the first and second front wheel support tube pivot mounts 334, 336 and the first and second reclining tube pivot mounts 372, 374. The terminal ends of the second attachment tether 154 may be fastened to the third and fourth tubes 342, 344 by conventional means, for example by rivets or latch and hook connectors.

The reclining portion 114 of the flexible reclining seat 100 is attached to the stroller frame 300 as follows. The terminal ends of the first attachment tether 148, which reside on the rear surface 112 and protrude outside the area defined by the first and second vertical edges 102, 104 and the first and second horizontal edges 106, 108, are fastened to the first and second web tubes 358, 360, proximal the first and second reclining tube pivot mounts 372, 374 and between the first and second reclining tube pivot mounts 372, 374 and the first and second pegs 368, 370. The terminal ends of the first attachment tether 148 may be fastened to the first and second web tubes 358, 360 by conventional means, for example by rivets or latch and hook connectors. The seat back u-tube portion 366 is inserted into the reclining tube pocket 144, which resides on the rear surface 112 and forms the first horizontal edge 106. The pocket enclosure means 146, which is centrally disposed along the lower aspects of the reclining tube pocket 144, serves to further secure the seat back u-tube portion 366 within the reclining tube pocket 144. Alternative means may be used to secure the set back u-tube portion 366 to the rear surface 112, for example by tethers riveted to the seat back u-tube portion 366. The first and second outer web portions 220, 222 are attached to the stroller frame by wrapping the first and second tabs 228, 234 around the first and second tubes 320, 322, at a location above the attachment points for the first and second biased catches 330, 332. The first and second tabs 228, 234 are secured to the first and second tubes 320, 322 by conventional means, for example by rivets or latch and hook connectors.

The connections between the flexible reclining seat 100 and the stroller frame 300 described above may be accomplished in any alternative fashion provided that the reclining portion 114 is allowed to advance from a reclined position to a substantially upright position. Also, although the preferred embodiment is described in terms of side webs for the sides of a seat back, the invention may be suitable for any collapsible fabric webbing that may be come caught between two engagement points.

Operation

The interaction between the flexible reclining seat 100 and the stroller frame 300 in the reclined position and the upright position will now be described. In the reclined position, shown in FIGS. 6 and 7, the first and second outer web portions 220, 222, which are secured to the first and second tubes 320, 322, lie in tension and support the reclining portion 114 in the reclined position.

The reclining portion 114 is pivoted to the upright position as follows. The reclining tube 312, which pivots about the first and second reclining tube pivot mounts 372, 374, is forced in the direction indicated by arrow A in FIG. 6. As the reclining tube 312 is pivoted toward the handle tube 302, the first and second inner web portions 200, 202 and the first and second outer web portions 220, 222 are influenced inward by the first and second shape memory elements 216, 218, toward the area defined by the first and second vertical edges 102, 104 and the first and second horizontal edges 106, 108. The first and second shape memory elements 216, 218 are affixed to the first horizontal edge 106 and first and second vertical edges 102, 104, respectively, in such a way that, even in the reclined position, the first and second inner web portions 200, 202 and the first and second outer web portions 220, 222 are biased slightly inward.

To maintain the reclining portion 114 in the upright position, the reclining tube 312 is releasably connected to the handle tube 302 by mating the first and second pegs 368, 370 with the first and second biased catches 330, 332, respectively. The first and second pegs 368, 370 and the first and second biased catches 330, 332 thus form a locking or latching mechanism for latching the seatback in the upright position. The existence of the first and second shape memory elements 216, 218 bias the first and second inner web portions 200, 202 and the first and second outer web portions 220, 224 away from the points of engagement between the first and second pegs 368, 370 and the first and second biased catches 330, 332, so that the side webs do not become entangled in, or block the interconnection of, the pegs and the biased catches during movement from the reclined position to the upright position.

Further, although in the preferred embodiment the webs are biased away from a latching mechanism that latches a reclining seat back in an upright position, other embodiments might include biasing the web for other purposes. For example, in the case of a folding stroller, a web might be biased away from fold or pinch points in the folding frame. The web also might be biased away from a latching mechanism used to hold a folding stroller in a folded and/or an unfolded operative position. Although a web for a reclining seatback is described above, the invention might also be applied to an collapsible fabric web on a child carrier, for example a fabric web on an edge of a seatback that does not recline.

What is claimed is:

1. A reclining seat, comprising:
    a seat support frame;
    a first web having a first end coupled to said seat support frame and a second end;
    a reclining member having a first web attachment edge coupled to said second end of said first web and being movable with respect to said support frame between a reclined position in which said reclining portion is supported in part by being suspended from said seat support frame by said first web, and an upright position;
    a first latch having a support latch portion coupled to said seat support frame and a seat latch portion coupled to said reclining portion, said support latch portion and said seat latch portion being selectively coupleable to support said reclining portion in said upright position;
    a first resilient member attached to said first web and urging said first web away from said seat latch portion of said first latch,
    whereby when said reclining portion is moved from said reclined position toward said upright position, said first resilient member inhibits said first web from interfering with the coupling of said latch portions.

2. A reclining seat according to claim 1, wherein said first resilient member is formed of resilient cord.

3. A reclining seat according to claim 1, wherein said first resilient cord is formed of plastic.

4. The reclining seat of claim 3, wherein said first web is formed of fabric and said resilient cord is attached to said first web by stitching.

5. A reclining seat according to claim 3, wherein said first resilient cord is formed of polypropylene.

6. A reclining seat according to claim 3, wherein said first resilient cord is formed of polyethylene.

7. A reclining seat according to claim 1, wherein said first resilient member is formed of metal wire.

8. A reclining seat according to claim 1, wherein said first resilient member is formed of plastic sheet.

9. A reclining seat according to claim 1, wherein said first resilient member is formed of plastic strip.

10. A reclining seat according to claim 1, wherein said first and second shape memory elements each comprise a resilient plastic sheet.

11. A reclining seat according to claim 1, wherein said first and second shape memory elements each comprise a resilient plastic strip.

12. A reclining seat according to claim 7, wherein said polypropylene cord has a diameter of approximately 0.125 inches.

13. A reclining seat, comprising:

a seat support frame;

a first web having a first end coupled to said seat support frame and a second end;

a reclining member having a first web attachment edge coupled to said second end of said first web and being movable with respect to said support frame between a reclined position in which said reclining portion is supported in part by being suspended from said seat support frame by said first web, and a upright position;

means for latching said seat support frame to said reclining portion, said latching means supporting said reclining portion in said upright position;

means for biasing said first web away from said first latching means to inhibit said first web from interfering with the operation of said latching means.

14. A reclining seat according to claim 13, wherein said biasing means comprises an elongate resilient member attached to said first web.

15. A reclining seat according to claim 14, wherein said elongate resilient member urges said first web away from said latching means when said reclining portion is moved from said reclined position to said upright position.

16. The reclining seat of claim 1, further comprising:

a second web having a first end coupled to said seat support frame and a second end;

said reclining member having a second web attachment edge coupled to said second end of said second web and being supported in said reclining position in part by being suspended from said seat support frame by said second web, said first and second web attachment edges being spaced laterally.

17. The reclining seat of claim 16, further comprising:

a second latch having a support latch portion coupled to said seat support frame and a seat latch portion coupled to said reclining portion, said support latch portion and said seat latch portion being selectively coupleable to support said reclining portion in said upright position;

a second resilient member attached to said second web and urging said second web away from said seat latch portion of said second latch.

18. The reclining seat of claim 1, wherein said first web has an upper edge and said first resilient member is disposed parallel and adjacent to said upper edge of said first web.

19. The reclining seat of claim 18, wherein said upper edge of said first web has a predetermined length and said first resilient member has a predetermined length less than said first web's length and extends from said second end of said first web.

20. A method of adjusting a reclining seat back of a child carrier having a seat support frame, the seat back being movable with respect to said seat support frame between a reclined position in which said seat back is suspended from said seat support frame by a first fabric web and an upright position in which said seat back is coupled to said seat support frame by a latch, comprising the steps of:

disposing a resilient member on said first fabric web oriented to urge said fabric web laterally inwardly;

moving said seat back toward said upright position, said resilient member urging said fabric web laterally inwardly.

* * * * *